United States Patent Office 2,895,878
Patented July 21, 1959

2,895,878

COMPOSITIONS CONTAINING STABILIZED VITAMIN A MATERIALS

Robert W. Lehman, Rochester, N.Y., assignor to Eastman Kodak Company, Rochester, N.Y., a corporation of New Jersey No Drawing. Application September 28, 1955
Serial No. 537,274

7 Claims. (Cl. 167—81)

This invention is concerned with the stabilization of vitamin A materials and is particularly concerned with vitamin A compositions having improved stability against loss of vitamin A activity and with an improved stabilizer for vitamin A compositions.

Vitamin A materials are extremely labile and are subject to loss of vitamin A activity or potency, particularly when exposed to air at elevated temperatures and humidities, or to such materials as minerals, enzymes and similar ingredients occurring in many vitamin A material-containing compositions. Synthetic vitamin A materials, that is, vitamin A materials prepared by chemical syntheses as distinguished from those obtained from natural sources, are particularly subject to loss of vitamin A activity as antioxidants and other preservatives found in vitamin A materials derived from naturally occurring sources are not present in the synthetic vitamin A materials. Stabilization of the highly labile unsaturated vitamin A materials has long been a problem of commerce.

It is accordingly an object of this invention to provide a vitamin A composition having improved stability against loss of vitamin A activity.

It is another object of this invention to provide a stabilized synthetic vitamin A composition having incorporated therein a novel stabilizer therefore.

It is an additional object of this invention to provide vegetable or animal oil solutions of vitamin A materials having improved stability.

It is likewise an object of this invention to provide high potency vitamin A concentrates having improved stability.

It is a further object of this invention to stabilize vitamin A compositions with a novel stabilizer combination.

It is also an object of this invention to provide a novel stabilizer combination.

These and other objects are accomplished by incorporating into vitamin A compositions stabilizing amounts of a combination comprised of 2,6-di-tertiary butyl-4-methyl phenol and tocopherol.

The 2,6-di-tertiary butyl-4-methyl phenol used in the present invention is commonly called butylated hydroxy toluene, or simply "BHT." For convenience, the term "BHT" will be used hereinafter.

The tocopherol employed in the present invention can be any of the known tocopherols including $\alpha$-, $\beta$-, $\gamma$-, and $\delta$-tocopherol or mixtures thereof. Tocopherols derived from natural sources such as soybean oil and the like as well as synthetically prepared tocopherols can be utilized in the stabilizer combination.

Any of the well-known vitamin A materials, such as vitamin A alcohol, vitamin A aldehyde, vitamin A acetate, vitamin A palmitate, vitamin A hydrocarbon (axerophtene), vitamin A ethers and related vitamin A materials can be stabilized against loss of vitamin A activity with the present stabilizer combination. The present stabilizer combination is particularly useful for stabilizing synthetic vitamin A materials against loss in potency, although naturally occurring vitamin A materials such as those derived from fish liver oils can also be stabilized.

Vitamin A materials of a wide range of potencies can be stabilized with the present BHT and tocopherol combination. The present stabilizer combination has particular utility for stabilizing vitamin A materials in the high potency concentrates of commerce which range from about 200,000 to about 2,500,000 U.S.P. units per gram of vitamin A. Likewise, compositions containing lower concentrations of vitamin A materials such as 10,000 or even 1,000 U.S.P. units per gram of vitamin A can be stabilized with the present stabilizer combination.

The amounts of BHT and tocopherol incorporated into vitamin A compositions to achieve a stabilizing effect can be broadly varied. The BHT can be suitably employed in amounts from 1.0 mg. to 50 mg. per 1,000,000 U.S.P. units of vitamin A, with amounts from 2.0 mg. to 30 mg. per 1,00,000 U.S.P. units of vitamin A being preferably employed. The tocopherol can be suitably employed in amounts ranging from 5 mg. to 150 mg. per 1,000,000 U.S.P. units of vitamin A, with amounts from 10 mg. to 50 mg. per 1,000,000 U.S.P. units of vitamin A being preferably employed.

The relative proportions of BHT and tocopherol comprising the present stabilizer combination can be broadly varied, although 1 to 5 parts of tocopherol to each part of BHT by weight are more generally employed.

The BHT and tocopherol stabilizer combination is uniformly and intimately admixed in the usual manner with the vitamin A material to be stabilized. As the stabilizer combination is oil soluble in the amounts employed, it can be readily incorporated into vitamin A materials.

The present stabilizer combination can be utilized to stabilize a diversity of vitamin A compositions including vitamin A materials dissolved in such vegetable and animal oils as corn oil, cottonseed oil, soybean oil, lard oil, beef tallow oil, sardine oil, and related oils. Likewise, the present stabilizer combination can be used to stabilize emulsions of vitamin A materials employing such emulsifying agents as polyoxyethylene derivatives of partial esters of polyhydric alcohols or other emulsifying agents. The present stabilizer can also be used to reduce vitamin A activity losses in various dry, free-flowing products suitable for fortifying animal feeds with vitamin A materials. Typical of such dry, free-flowing products are vitamin A material-containing beadlets or pellets comprised essentially of such materials as mineral waxes, solid fatty materials, gelatin, gums, synthetic resins, and the like, or mixtures thereof. Similarly, vitamin A materials absorbed on such vegetable materials as soy-grits and the like can be stabilized with the present stabilizer combination.

The stabilizing effect of the present BHT and tocopherol combination on several well-known vitamin A materials was tested. The results of these tests are tabulated in the following table.

*Table*

| Vitamin A Material | Mg. per 1,000,000 U.S.P. Units of Vitamin A | | Hours to Reach 20% Destruction of Vitamin A at 37° C. |
|---|---|---|---|
| | BHT | Tocoph.[1] | |
| I. Synthetic Vitamin A Palmitate | A. 5 mg.<br>B. 10 mg.<br>C. (none)<br>D. (none) | A. 5 mg.<br>B. (none)<br>C. 10 mg.<br>D. (none) | A. 96<br>B. 75<br>C. 31<br>D. 7 |
| II. Synthetic Vitamin A Acetate | A. 10 mg.<br>B. 10 mg.<br>C. (none)<br>D. (none) | A. 30 mg.<br>B. (none)<br>C. 30 mg.<br>D. (none) | A. 230<br>B. 154<br>C. 98<br>D. 25 |
| III. Synthetic Vitamin A Aldehyde | A. 10 mg.<br>B. 10 mg.<br>C. (none)<br>D. (none) | A. 30 mg.<br>B. (none)<br>C. 30 mg.<br>D. (none) | A. 211<br>B. 141<br>C. 131<br>D. 45 |

[1] Mixed tocopherols derived from soybean oil.

In the above table, the vitamin A palmitate sample was a corn oil dilution containing 1,000,000 U.S.P. units per gram, and the vitamin A acetate and vitamin A aldehyde samples were corn oil dilutions containing 500,000 U.S.P. units per gram.

The data in the above table was obtained by subjecting the various samples to a thin film air exposure test at an elevated temperature. The test comprised placing five drops (about 150 mg.) of the vitamin A material to be tested in the cylindrical depression of a microculture slide, placing the slide in an oven at 37° C., and thereafter periodically removing a drop of the exposed sample to determine loss of potency of the vitamin A material. The microculture slides employed were 75 by 25 by 6 mm. glass slides having therein cylindrical depressions 16 mm. in diameter and 3 mm. in depth. The analysis for loss of vitamin A material was effected by the standard antimony trichloride blue color assay procedure.

As can be observed from the data in the above table, the present BHT and tocopherol combination has a marked stabilizing effect on various vitamin A materials. Thus, by means of this invention, vitamin A compositions normally subject to considerable deterioration have their stability greatly enhanced by the addition of the present stabilizer composition.

The invention has been described in considerable detail with reference to certain preferred embodiments thereof, it will be understood that variations and modifications can be effected within the spirit and scope of the invention as described hereinabove and as defined in the appended claims.

I claim:

1. A vitamin A composition having incorporated therein a stabilizer combination comprising tocopherol in amounts from 5 mg. to 150 mg. per 1,000,000 U.S.P. units of vitamin A in said composition and 2,6-di-tertiary butyl-4-methyl phenol in amounts from 1.0 mg. to 50 mg. per 1,000,000 U.S.P. units of vitamin A in said composition, the relative proportions of tocopherol and 2,6-di-tertiary butyl-4-methyl phenol in said stabilizer combination being 1 to 5 parts of tocopherol to each part of 2,6-di-tertiary butyl-4-methyl phenol, said tocopherol being present in addition to any tocopherol naturally present in other constituents of said composition.

2. A composition comprising a synthetic vitamin A material and a stabilizer combination comprising tocopherol in amounts from 10 mg. to 50 mg. per 1,000,000 U.S.P. units of vitamin A in said composition and 2,6-di-tertiary butyl-4-methyl phenol in amounts from 2.0 mg. to 30 mg. per 1,000,000 U.S.P. units of vitamin A in said composition, the relative proportions of tocopherol and 2,6-di-tertiary butyl-4-methyl phenol in said stabilizer combination being 1 to 5 parts of tocopherol to each part of 2,6-di-tertiary butyl-4-methyl phenol, said tocopherol being present in addition to any tocopherol naturally present in other constituents of said composition.

3. A composition comprising a vitamin A material dissolved in an oil selected from the group consisting of vegetable oils and animal oils, and a stabilizer combination comprising tocopherol in amounts from 5 mg. to 150 mg. per 1,000,000 U.S.P. units of vitamin A in said composition and 2,6-di-tertiary butyl-4-methyl phenol in amounts from 1.0 mg. to 50 mg. per 1,000,000 U.S.P. units of vitamin A in said composition, the relative proportions of tocopherol and 2,6-di-tertiary butyl-4-methyl phenol in said stabilizer combination being 1 to 5 parts of tocopherol to each part of 2,6-di-tertiary butyl-4-methyl phenol, said tocopherol being present in addition to any tocopherol naturally present in other constituents of said composition.

4. The composition described in claim 3 wherein the vitamin A material is vitamin A acetate.

5. The composition described in claim 3 wherein the vitamin A material is vitamin A palmitate.

6. The composition described in claim 3 wherein the vitamin A material is vitamin A aldehyde.

7. A vitamin A composition containing more than 200,000 U.S.P. units of vitamin A per gram and having incorporated therein a stabilizer combination comprising tocopherol in amounts from 5 mg. to 150 mg. per 1,000,000 U.S.P. units of vitamin A in said composition and 2,6-di-tertiary butyl-4-methyl phenol in amounts from 1.0 mg. to 50 mg. per 1,000,000 U.S.P. units of vitamin A in said composition, the relative proportions of tocopherol and 2,6-di-tertiary butyl-4-methyl phenol in said stabilizer combination being 1 to 5 parts of tocopherol to each part of 2,6-di-tertiary butyl-4-methyl phenol, said tocopherol being present in addition to any tocopherol naturally present in other constituents of said composition.

References Cited in the file of this patent

UNITED STATES PATENTS

| | | |
|---|---|---|
| 2,686,751 | Embree | Aug. 17, 1954 |
| 2,693,435 | Stieg | Nov. 2, 1954 |
| 2,809,914 | Stokstad | Oct. 15, 1957 |

OTHER REFERENCES

Food Manufacture, October 1954, p. 398.